United States Patent
Schmeringa

(10) Patent No.: US 11,144,029 B2
(45) Date of Patent: Oct. 12, 2021

(54) METHOD OF OPTIMIZATION OF CUTTING OF FLAT PRODUCTS MADE OF NATURAL MATERIAL, MAINLY OF WOOD, AND SYSTEM FOR ITS REALIZATION

(71) Applicant: Biatec Laser Technology S. R. O., Bratislava (SK)

(72) Inventor: Peter Schmeringa, Kostolne (SK)

(73) Assignee: BIATEC GROUP a.s., Bratislava (SK)

( * ) Notice: Subject to any disclaimer, the term of this patent is extended or adjusted under 35 U.S.C. 154(b) by 36 days.

(21) Appl. No.: 15/755,079

(22) PCT Filed: Aug. 25, 2016

(86) PCT No.: PCT/IB2016/055080
§ 371 (c)(1),
(2) Date: Feb. 25, 2018

(87) PCT Pub. No.: WO2017/033148
PCT Pub. Date: Mar. 2, 2017

(65) Prior Publication Data
US 2019/0018389 A1    Jan. 17, 2019

(30) Foreign Application Priority Data
Aug. 25, 2015   (SK) .................... 50044-2015

(51) Int. Cl.
*G05B 19/402* (2006.01)
*B26D 5/00* (2006.01)
(Continued)

(52) U.S. Cl.
CPC ............. *G05B 19/402* (2013.01); *B26D 5/00* (2013.01); *B26D 5/007* (2013.01); *B26F 1/3813* (2013.01);
(Continued)

(58) Field of Classification Search
CPC ............. G05B 2219/31372; G05B 2219/35168
(Continued)

(56) References Cited

U.S. PATENT DOCUMENTS

| 4,691,751 | A | 9/1987 | Komulainen |
| 6,690,990 | B1 * | 2/2004 | Caron ................ B27G 1/00 |
| | | | 144/363 |

(Continued)

FOREIGN PATENT DOCUMENTS

| CA | 2590347 | 11/2008 |
| CA | 2714323 | 3/2011 |

(Continued)

OTHER PUBLICATIONS

McMillin et al., "ALPS—A potential new automated lumber processing system" Forest Products Journal vol. 34 No. 1, pp. Jan. 13-20, 1984 (Year: 1984).*

(Continued)

*Primary Examiner* — Emilio J Saavedra
(74) *Attorney, Agent, or Firm* — Defillo & Associates; Evelyn A Defillo

(57) ABSTRACT

When cutting the flat products (3) a set of the desired shapes and dimension of the products (3) is defined. Firstly at least one surface of the material (1) is scanned; scanning sets the boundaries of the available surface of the material (1). Optical scanning can be supplied by radiological scanning, preferably by a CT scanner (8). Defects (2) are identified in the scanned image and a position is assigned to them. A weight coefficient is assigned to each element from a set of the desired shapes and dimensions of the products (3). A cutting plan (4) is created; this plan (4) defines the boundaries of individual flat products (3), whereby the places with the identified defects (2) of the material (1). Optimalization of the distribution of the desired products (3) is realized with (Continued)

the goal of achieving the highest sum of the number of the products (3) multiplied by the weight coefficient of a given product (3) without the need to cut all the elements from a set of the desired products (3). Subsequently a cutting machine (6) is used to cut the products (3); this machine (6) cuts the material (1) without any limitation with regard to the mutual position of the cut lines of the neighboring products (3).

10 Claims, 7 Drawing Sheets

(51) Int. Cl.
  *G05B 19/401* (2006.01)
  *B27B 1/00* (2006.01)
  *B26F 1/38* (2006.01)
  B23K 26/402 (2014.01)
  B23K 26/382 (2014.01)

(52) U.S. Cl.
  CPC ............ *B27B 1/007* (2013.01); *G05B 19/401* (2013.01); *B23K 26/382* (2015.10); *B23K 26/402* (2013.01); *G05B 2219/31372* (2013.01); *G05B 2219/35162* (2013.01); *G05B 2219/35168* (2013.01)

(58) Field of Classification Search
  USPC .......................................................... 700/159
  See application file for complete search history.

(56) References Cited

U.S. PATENT DOCUMENTS

| 2002/0040283 | A1* | 4/2002 | Woods | G01N 23/04 |
| | | | | 702/189 |
| 2010/0161096 | A1 | 6/2010 | Giudiceandrea | |
| 2014/0238209 | A1 | 8/2014 | Saastamo | |

FOREIGN PATENT DOCUMENTS

| CA | 102508938 | 6/2012 |
| CN | 1986835 | 6/2007 |
| CN | 203999642 | 12/2014 |
| EP | 1724075 | 11/2006 |
| EP | 2202039 | 6/2010 |
| EP | 2228183 | 9/2010 |
| FR | 2779378 | 12/1999 |
| FR | 2935923 | 3/2010 |
| RU | 2009107949 | 9/2010 |
| WO | WO9105245 | 4/1991 |
| WO | WO2014174147 | 10/2014 |

OTHER PUBLICATIONS

Marchenko et al., "Support Methods of Linear Programming for Cutting Raw Material Problem" IFAC Automatic Measurement and Control in Woodworking Industry, vol. 19 Iss 12, Nov. 1986, pp. 55-57 (Year: 1986).*

Gilmore et al., "Multistage Cutting Stock Problems of Two and More Dimensions" Operations Research, vol. 13, No. 1 (Jan.-Feb. 1965), pp. 94-120 (Year: 1965).*

Ferdman, "Choosing a Hardwood Flooring Wood Species" accessed at https://web.archive.org/web/20111011052451/https://www.hoskinghardwood.com/Department/Hardwood-Floors/Choosing-a-Hardwood-Flooring-Wood-Species.aspx?dld=7&pageId=40, Oct. 11, 2011, 5pg printout (Year: 2011).*

* cited by examiner

METHOD OF OPTIMIZATION OF CUTTING OF FLAT PRODUCTS MADE OF NATURAL MATERIAL, MAINLY OF WOOD, AND SYSTEM FOR ITS REALIZATION

CROSS REFERENCE TO RELATED APPLICATION

This application is a national stage entry of PCT/I62016/055080 filed Aug. 25, 2016, under the International Convention claiming priority over Slovakia Patent Application No. PP 50044-2015 filed Aug. 25, 2015.

FIELD OF THE INVENTION

The invention concerns the optimalization of cutting of the flat products from the natural material which has or may have surface and/or internal irregularities or defects, whereby these irregularities are firstly detected and the cutting plan is devised taking these irregularities into account. The invention discloses a system for optimalized cutting of the flat natural intermediate products, mainly of wooden planks, stone plates, leather and so on.

BACKGROUND OF THE INVENTION

During the cutting of the homogenous materials an optimalization is used which ensures that the available material is used without the useless waste. One-dimensional optimalization during the division of the rod-like material such as various profiles, pipes or tree trunks which are divided to desired lengths is known, for example according to WO2014174147 A1. Two-dimensional optimalization is known, too, where the optimal distribution of the desired products—for example, of cuts in the clothing industry—on the available surface of the intermediate product is sought. The situation is more complicated in case the material is not homogenous, where it has natural defects which it is desired to avoid in the cutting plan so they do not become part of the cut products. Solution according to FR2935923 A1 suggests the longitudinal cut along the cross section of the log, which, however, does not allow taking defects which appear on the surface of the cut plank into account. The publication RU2009107949 A discloses a cutting by means of multiple saw blades where the distribution of the products is optimalized by the computer but where it does not take into account the distribution of the defects, which leads to cutting of the damaged waste products.

The method of optimalization is known where the surface of the natural intermediate product is scanned and the irregularities or defects are detected in it according to preset criteria, for example a method according to CN203999642 U, CN102508938 A. These defects are during the subsequent optimalization considered as necessary boundaries of the division. In such process the resulting cut flat products do not have defects which were detected in the previous step. The disadvantage of such process is that even if it leads to the high degree of the use of the available surface of the material, this state is usually not the most economic and effective use of the material.

The methods where the inner defects in the log are detected by means of X-rays and on the basis of the spatial distribution of the detected damages the angle and direction of the cutting of the log is set. Such methods are disclosed in the publications CA2590347A1, CA2714323A1, EP2202039A1, EP2228183A2, WO9105245A1, where the image defining the three-dimensional structure of the log is produced by tomography. Despite the increasing exactness of the computer tomography, the produced image cannot be reliably used during the assessment of the planks which result from the cutting of the log; planks are not radiologically scanned and there are deviations between the planned and actual cut of a log; tomography, for example, does not detect the deviation from the desired color. In order to determine the quality of the final product it is important.

Method according to publication FR 2779378 A1 involves the recognition of the defects in the wooden planks and then it is followed by cutting of the wood into plates which avoid the earlier recognized defects and then the plates are cut into individual products. Since the circular saw according to this method can only cut in straight lines, the solution is only usable in the case of products with identical, uniform width (FIG. 1). Optimalization after cutting to the plates of uniform width is then narrowed to one-dimensional optimalization. A product with the smaller width can be cut from the plate of a given width, but this produces another waste. In practice the products with various dimensions are demanded; the cutting of the wooden planks to the plates which bypass the earlier recognized defects is not effective enough from the point of view of the economic and surface usability.

Known methods of the optimalization lead to the production of the larger amount of small products, since the repetition of the small product on the available surface reliably achieves higher degree of the use of the surface, but this does not lead to the economically and ecologically most appropriate use of the wooden material. More effective optimalization is desired and not known, during which the available material is used with the highest possible economic and ecological effect.

SUMMARY OF THE INVENTION

Abovementioned deficiencies are significantly remedied by the method of optimalization of cutting of the flat products from the natural material, mainly from wood, where the group or set of the desired shapes and dimensions of the products to be cut is set in advance, and where the visible surface of the material is scanned in advance and the defects of the material are identified in the scanned image, whereby these defects manifest themselves by a predefined optical differences against the environment, the position on the visible surface of the material is assigned to the recognized defects, and the cutting plan determining the boundaries of individual flat products is created, whereby during the creation of the cutting plan the places with the identified defects of the material are taken into account and the distribution of the desired products on the available surface of the material is optimized by means of a numerical algorithm according to this invention which essence lies in the fact that the weighting coefficient is assigned to each element in the group of the desired shapes and dimensions of the product and the optimalization of the distribution of the desired products is realized with the goal of achieving the sum of the number of the products multiplied by the weighting coefficient of a given product without the need to cut all products from the group of desired products. Subsequently the cutting machine which cuts the material without the limitations concerning the mutual position of the cut lines of the neighboring products is used to cut the products.

In the preferable arrangement it is not just one visible surface that is scanned, but both visible surfaces. The defect in the body of the material can have a course which does not manifest itself on the opposite side of the plank. If it suffices in case of a particular product that it is without defects on one side only, it is preferable to scan both visible sides of the plank, which can help to determine that in case of appropriate cutting plan a product is cut which involves one small defect on one side but is without defect on the opposite side. Scanning of a single side would not allow such assessment. When scanning both sides, the mutual position of both scans will be secured, for example by the beginning of x,y (0,0) of the reference coordinate system.

In the grown natural materials such as wood there is often a relation between the defects on one side and on the opposite side of the plank. Gathering of two scans from a single plank simplifies the subsequent recognition and classification of the defects. More complex information about the material is gathered in such a way that the material is optically scanned on all surfaces—that is, from sides, too.

When detecting the defects the computer tomography can be used which allows searching the inner defects, too. The plank from which the final product is cut is scanned radiologically; thanks to this the distribution of the defects is determined with high positional precision which is related to the proposed position of the product.

Since the product is subsequently cut with high precision against the earlier defined beginning x,y (0,0) of the reference coordinate system, the set of data corresponding to the locality where the given product is located according to the cutting plan can be separated from the results of the optical scanning and, eventually, from the results of the CT scanning, too. This way it is possible to produce image, a sort of "birth certificate" of each product without the need to scan each product after its cutting. In case of important products, such as mechanically loaded beams, this result of scanning can be handed in together with the product itself. During the later revision the new data can be compared with the state of the product during the expedition.

The use of the computer tomography during the optical scanning allows connecting the results of these two methods during the classification of the defects. Internal non-homogeneity of the material detected by the computer tomography allows analyzing more reliably that a defect detected on the outer surface by the optical scan at the given place of the plank has a peculiar character specific for the given type of the defect. The use of the optical scanning and computer tomography for a single plank brings about synergic effect; the reliability of classification of defects increases, the number of waste products diminishes.

Hitherto known algorithms of the optimal distribution of the products on the available surface of the material stemmed from the presupposition that the results of the cutting shall be all elements from the particular set of the desired shapes and dimensions, preferably with the smallest possible consumption of the available material, or that the result shall be the largest amount of sets with all elements. This method stemmed mainly from the needs of the clothing industry where it is naturally desired that all sorts of cuts are cut; otherwise the whole new product cannot be sewn together. The optimization algorithm therefore works in such a way that it distributes individual elements of the set in various orientations, whereby a condition is defined that the elements from a given set appear on the available surface in any number of repeats. During the process according to this invention this important condition is cancelled and substituted by the goal to achieve the highest weight of all products. The weight coefficient will usually express the price or similar economic parameter of the element in the set. In the optimization process according to this invention it is not necessary to distribute all the elements from the set—the most important thing is that the highest weight sum is achieved, which basically means that the highest economic value possible from the available material is achieved.

The method according to this invention is intended for the cutting of the natural material, preferably it will be used for the cutting of the solid plank materials such as wooden planks, wooden plates or plates from the natural material. Naturally, the optimization will be preferable mainly with relatively expensive materials; in case of wood it will be mainly hardwood such as oak, beech, elm, ash, black locust, walnut tree and so on.

Log, that is, debranched trunk of the tree is cut to planks of the desired width; circular saws or band saws are used for this cutting. A material is produced by cutting of the plank, whose cutting into individual products is a subject to the optimization according to this invention.

Natural material has randomly distributed defects, even though there may be certain regularity in their localization. For example, after the cutting of the trunk the distribution of the knots in the individual layers, that is, in the individual planks, is intertwined; after the cutting of another trunk the distribution of the knots is different. The term "defect" in this description denotes any phenomenon which should be monitored according to the demands of the client. The term "defect" therefore does not have to denote an anomaly—for example, a dendrologic defect —, it can be a common, natural phenomenon whose presence on the product should be, however, subordinated to predefined criteria.

During the optimization of cutting by means of a scanning and recognition of the defects a cutting plan is created only within the surface of a single piece of the material. Another piece of the available material is scanned and assessed individually; it is not the case that the surface of multiple materials which would have eventually been subsequently scanned, is assessed, and the cutting plan is then created for multiple materials. Even with the method according to this invention, only one piece of material is always scanned and assessed. The cancellation of the condition to cut all products of a set from a single piece of material is statistically compensated by the fact that the distribution of the defects in a larger number of the pieces of material is random and in some degree regular. If the maximal economic use of the material is pursued with each piece, the overall use of the total set of the available material will be maximally economical, too.

The surface of the material can be optically scanned by various devices known in the prior state of the art. The optical sensing can take place within visible spectrum—it can take place at various wavelengths pursuant to the knowledge concerning the identification of the defects in the natural material. What is crucial during the optical scanning of the surface are other defects visible by the human eye, since the visual impression is appreciated in case of natural materials. Analysis can concern prefiltration and spectral analysis where the zones with the set contrast against the environment are recognized. These zones are then assessed, for example, by means of comparison with the stored classifiers of the defects; boundaries are the assigned to the defects on the scanned surface. This optical scanning of the surface can be supplied by the radiological scanning where—as we have stated above—the inner homogeneity of the material, or the distribution of the inner defects of the material, respectively, is analyzed by means of a CT device. The process during the optical scanning is usually such that the material is placed on the working table on which the material will be later cut and between the working table and the head of the scanner there is a mutual movement. It is the working table which can move while the head is static, or it can be vice versa. In case of radiological scanning it is preferable if the material moves between two tables or suppliers, so that these support devices do not obstruct the direction of the X-ray in all directions. The CT scanner is placed between two support devices. By means of a computer image reconstruction an image for individual layers in the material is produced from the detected radiation falling in different angles A cutting plan can be now created which will define the boundaries of individual flat products. On one hand there is during the creation of this plan a set of desired shapes and dimension of products which are to be cut. For example, in case of common rectangular products, each product will be defined by two dimensions. On the other hand there is a scanned shape of the available surface at disposal, whereby the ground plans of the desired dimensions and shapes of the products are to be most appropriately distributed on this surface. The surface has outer boundaries which are defined by the edge of the material with some eventual allowance; for example, with allowance corresponding to the remnants of the bark of the tree. Alongside the outer boundaries, the distribution of the defects is taken into account during optimization, too.

It is an important condition that the cutting takes place without the limitations to mutual position of the cut lines of the neighboring products, which means that the line of the cutting can run with any changes in the direction. Therefore, for example, circular saws are of no use since they can only can in the straight direction and they are unable to change the cutting line for example in 90° to produce a rectangular cut. The desired condition is met by the point cutting such as laser cutting, water jet cutting and so on. In case of wood products the laser cutting will be preferable.

The fact that cutting can run in any direction with any shape and distribution of the cutting lines also affects the statistical density of the presence of individual products from a given set of the products. According to this invention only one plank, one piece of material is scanned and assessed. From the point of view of achieving the regular presence of individual products it will be preferable if all available pieces of the material—for example, all pieces of the material which are planned to be cut during a single workday—are scanned and assessed beforehand and the optimization of the cutting plan takes only place subsequently. This would, however, lead to logistical problems with the intermediate storage and it would create risks concerning the wrong identification of individual pieces. If, however, the shape limitation of the cutting line is removed, that is, if the circular saw known in the prior state of the art is not used and, at the same time, the cutting plan is optimized with the demand for maximum weight sum, then the relatively even distribution of the products takes places on the whole group of the available pieces of the material, whereby the maximal total yield is achieved, too. And this all happens without the need to realize the optimalization on whole group of the pieces of the available material at the same time.

In order to use the available natural material in the most economically and ecologically effective way, it will be preferable if the identified defects are assessed and assigned to multiple categories, whereby at least one category involves defects which are—under certain conditions—acceptable within the resulting final product. Weight coefficient will be affected by the presence of the acceptable surface in the given product. Usually it will hold that the larger the product, the larger the weight coefficient of this product. The acceptable defects can be categorized into various groups. For example, a defect in form of a crack will usually be unacceptable defect, since this crack directly affects the mechanical features of the product.

During the creation of the cutting plan the places with the identified defects of the material are taken into account together with their classification. The distribution of the desired products on the available surface of the material is optimized by the numerical algorithm. Multiple optimization algorithms are known in other fields of technology. Linear programming, linear optimizing, also named as linear planning, solves a set of linear equations and inequations by means of iterative calculations of matrices.

Basic optimization task during arrangement according to this invention is to find the maximal weight count of the products. The peripheral or boundary conditions define that none of the products can surpass the available surface (outer boundaries of the available material); and that none of the products can interfere in the zone with the defect from the category of unacceptable defects (prohibition on production of waste products). The optimization task can be supplied by the rule that the sought maximum weight count also counts the weight value of the waste. This can be counted on the basis of the surface of the material which will remain idle after the cutting. With each step of the calculation of the distribution of the desired products it is simply possible to calculate the surface of the waste in such a way that we discount the surfaces of all distributed products from the scanned available surface. The waste can have a certain value—such as positive weight value—but handling of the waste can, according to the nature of the material, be connected with costs, and in such case the weight coefficient can be negative.

The abovementioned deficiencies in the prior state of the art are greatly remedied by the system of optimization of cutting of the flat products from the natural materials, mainly wood, too, where the system includes a scanner of the visible surface of the material, a cutting machine and a controlling computer with which both the scanner and the cutting machine is connected, whereby a database is stored in the controlling computer, whereby this database contains at least one set of the desired shapes and dimensions of the products, and the controlling computer has an output for the controlling and direction of the cutting line of the cutting machine according to the cutting plan, whereby the essence of this system according to this invention lies in the fact that the weight value stored in the database is assigned to each product, in the controlling computer there is a program for the optimalization of the cutting plan with the condition of the maximal sum of the weight values of the products, whereby the cutting machine is adjusted for the jump changes in the direction of the cut line.

In the preferable arrangement the system has CT scanner by means of which the inside of the plank is radiologically investigated and inner defects are determined. CT scanner is connected to the controlling computer where the optimalization algorithm runs.

The controlling computer can be separated into multiple independent computer units. The scanner usually has its own control of the movement of the material or optical head and the output from the scanner can consist of raw bitmap data or analyzed data or vector data. Another controlling unit can control the movement of the cutting head, for example laser head. The cutting plan can be optimized in the independent control unit, for example in form of a personal or industrial computer. This computer receives data from scanner and uses it during the optimization and the resulting cutting plan is sent to the control unit of the cutting machine. This arrangement can integrate scanners and cutting machine from various suppliers. The integration will be done by control unit with the optimization program.

Optical scanner can in preferable arrangement contain two optical strips—upper and lower; the plank will be scanned from two sides during a single movement of the plank. In case the CT scanner is involved in the system it will be preferable if during the single movement the plank is scanned optically and radiologically, too.

In preferable arrangement the cutting machine will be a machine which acts on points, or which point cuts; preferably, it will be laser cutting machine.

The advantage of this invention is significant increase in the economic yield of the available natural material, which subsequently leads to lowering of the environmental burden. The method and system are very flexible; they effectively use all shape and dimensional features of a particular material; recognized defects are assessed and made use of, whereby the system can be fully automated.

BRIEF DESCRIPTION OF DRAWINGS

The invention is further disclosed by means of drawings 1 to 7. The used scale and shapes of the products, their mutual size ratio as well as the distribution of the defects are not binding, they are informative or directly adjusted for the purposes of clarity. The chosen ratios and shapes cannot be interpreted as limiting the scope of protection.

EXAMPLES OF REALIZATION

Example 1

Figure 1:
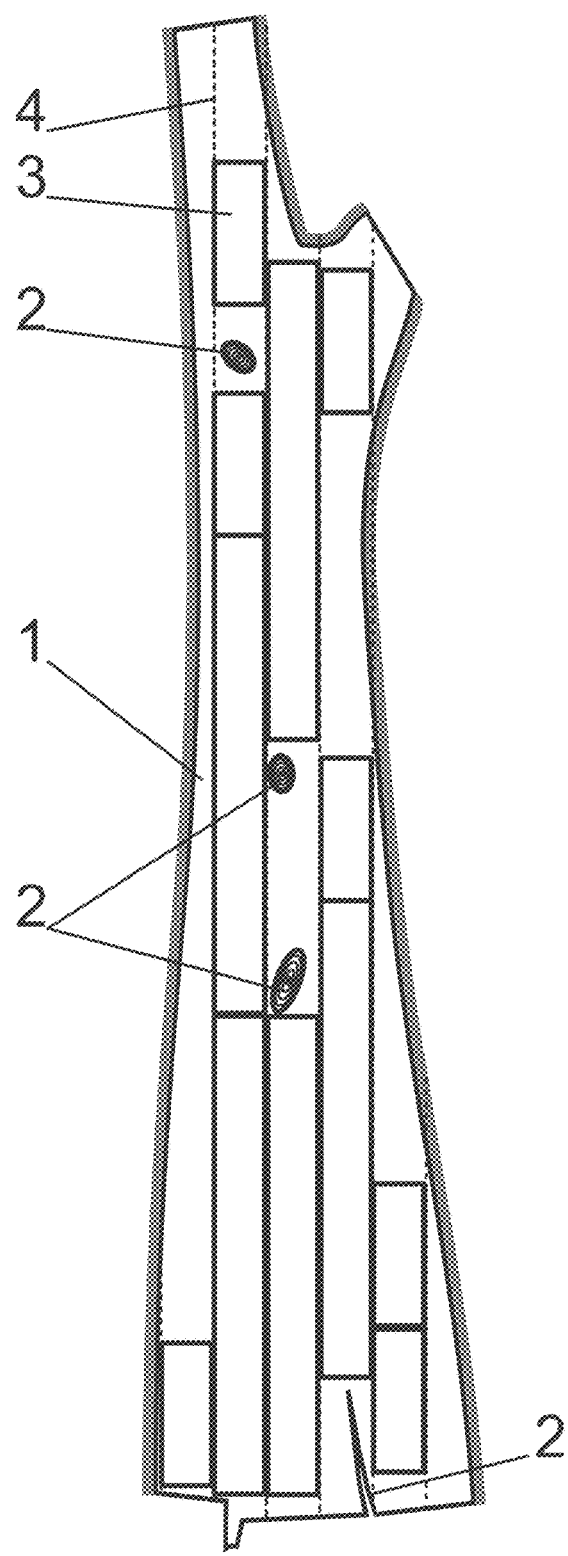
FIG. 1 depicts a cutting plan pursuant to the prior state of the art in case of the optimization for the circular saw where it can be seen that the cut lines of the neighboring products are intertwined and defined by the common longitudinal cut which forms the basic plates.
Figure 2:
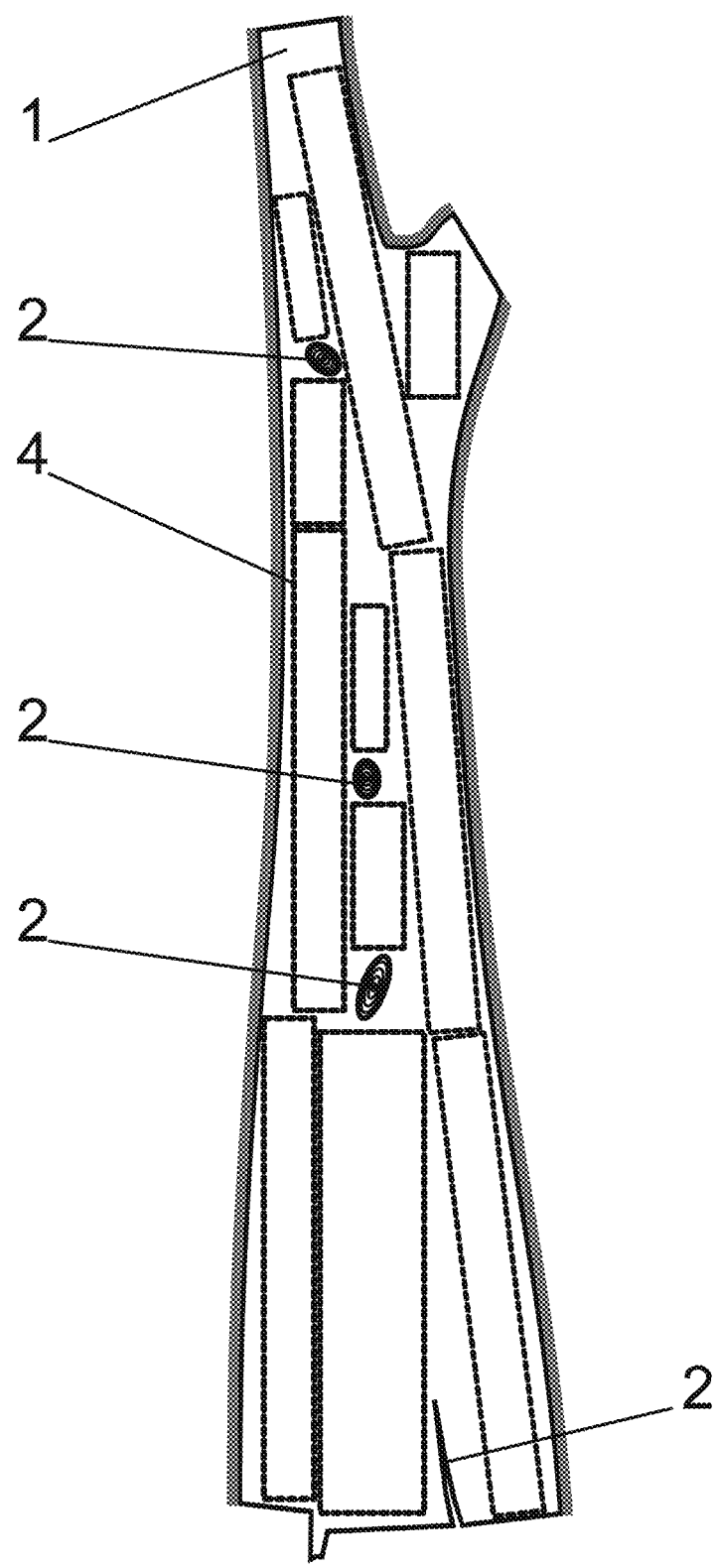
FIG. 2 depicts a cutting plan with the products during weight optimization according to this invention where the independence of the cut lines of the neighboring products can be seen, whereby all recognized defects are avoided and bypassed.
Figure 3:
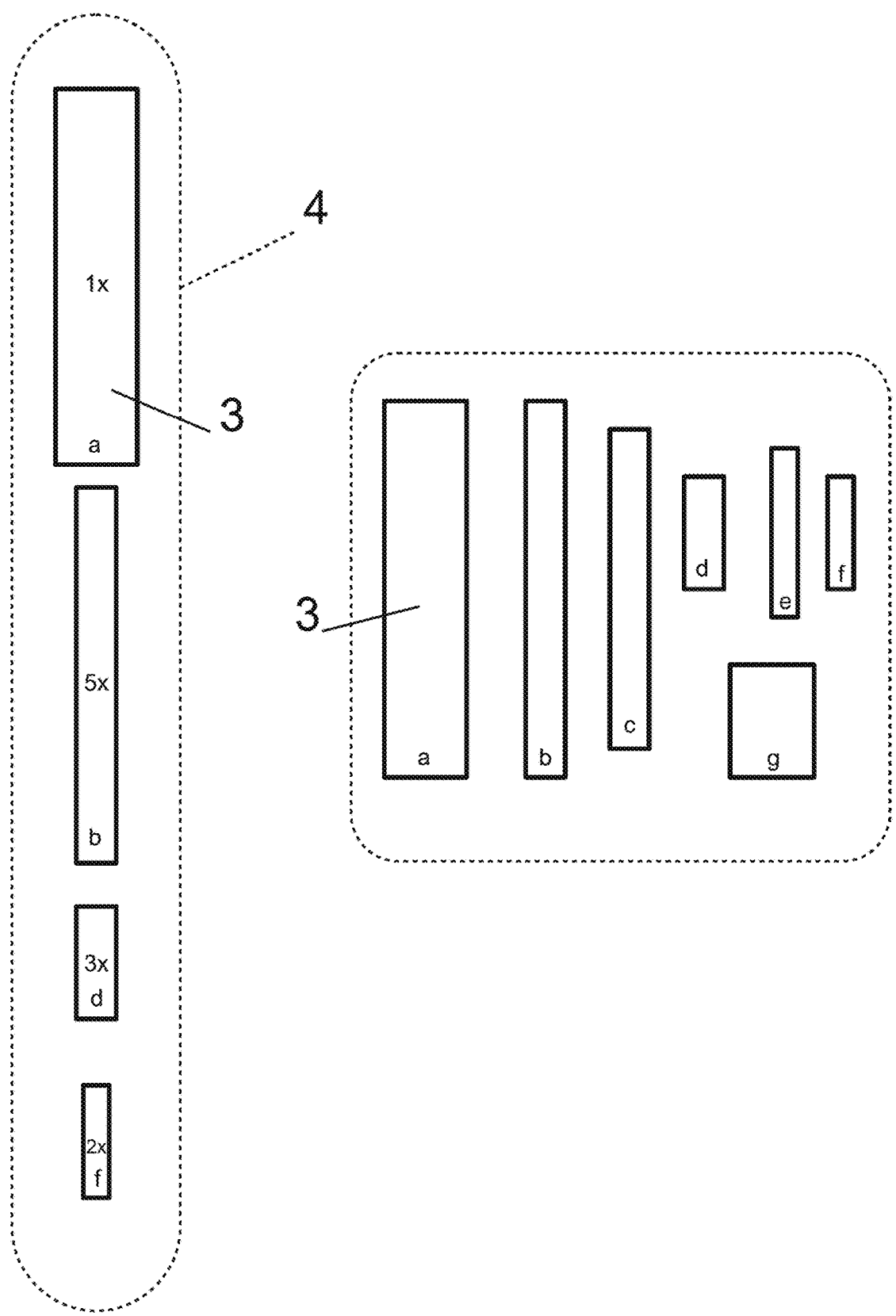
FIG. 3 on the left there are cut products from the FIG. 2; on the right there is a set of the desired shapes and dimensions of the products.

In this example according to FIGS. 2 and 3 is a method and system used at wood processing enterprise. The debranched trunks of the hardwood trees are cut to planks with the width which corresponds to the width of the products of one set of the desired shapes and dimensions of the products 3.

In this example the debranched trunk of the tree is after the basic peeling off of the bark cut by a set of the circular saws to the width 25 mm. This creates the plates on the surface of which there are defects 2 such as knots, cracks or zones with mechanical or biological damage. These defects 2 can be recognized on the basis of the optical analysis.

The scanner 5 is placed above the working table of the cutting machine 6. The working table moves in two directions; during scanning the working table moves in one direction and the plank placed on the working table runs under the scanner 5.

When scanning the surface of the visible side of the plank the gathered image is analyzed in such a way that the color of the pixels and contrast of the neighboring pixels—or contrast of groups of pixels—is analyzed. This analysis is realized in the controlling unit of the scanner 5. At its output there is a file which discloses the outer boundaries of the scanned surface and it also discloses the boundaries of the recognized defects 2. Polygon S defines a shape of the available surface of the scanned plank. Defects 2 are described by the list of polygons E, which delimit the defect 2.

The output from the scanner 5 is connected to the controlling computer 7 where there is a database with the products 3. The product 3 is defined by width W and length L. A weight coefficient C is assigned to each product 3 in the database.

In this example the absence of the defects 2 of any category is required for all products 3. The conditions from the database of the desired products 3, the definition of polygon S of an available surface and polygon E of the defects 2 are re-written into the matrix of the linear programming. The result of the iterative method of the optimalization is a cutting plan 4 according to FIG. 2.

The plank is cut by the laser cutting machine 6 according to the calculated cutting plan 4. As can be seen on the FIG. 3, not all elements from the database of the desired products 3 are contained in the result of the cutting; however, maximal economical yield from the available material 1 is achieved.

Example 2

Figure 4:
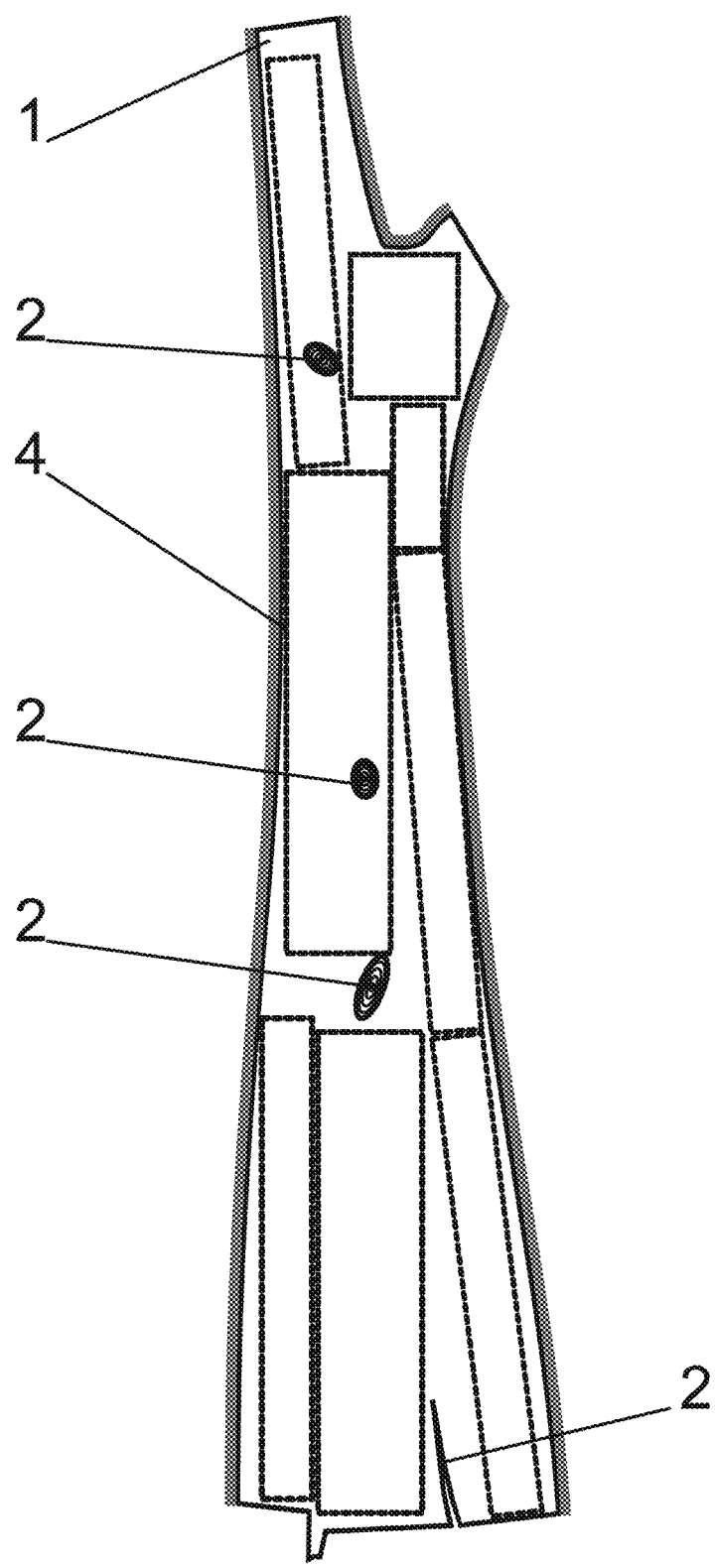
FIG. 4 depicts a cutting plan where during the optimalization a classification of defects is used. Optimization is realized on the same basis as in case of the FIG. 2. The allowed defects are part of the product.
Figure 5:
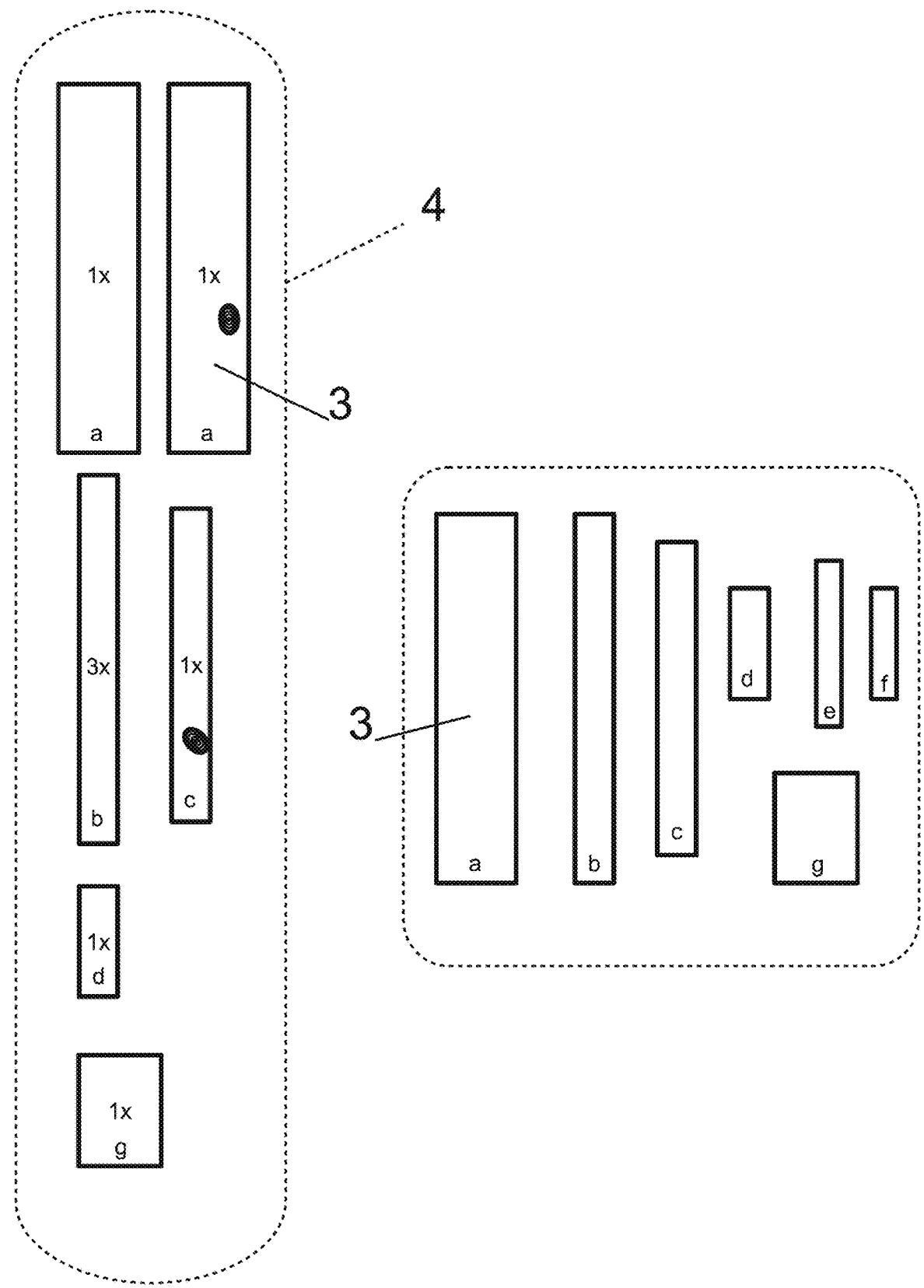
FIG. 5 on the left there are cut products from the FIG. 4 and on the right there is a set of the desired shapes and dimensions of the products with the acceptable defects. Even though the number of the cut products according to FIG. 5 is smaller than the number on FIG. 3, its value is higher with regard to the products with larger surface and therefore the weight coefficient is higher.
Figure 6:
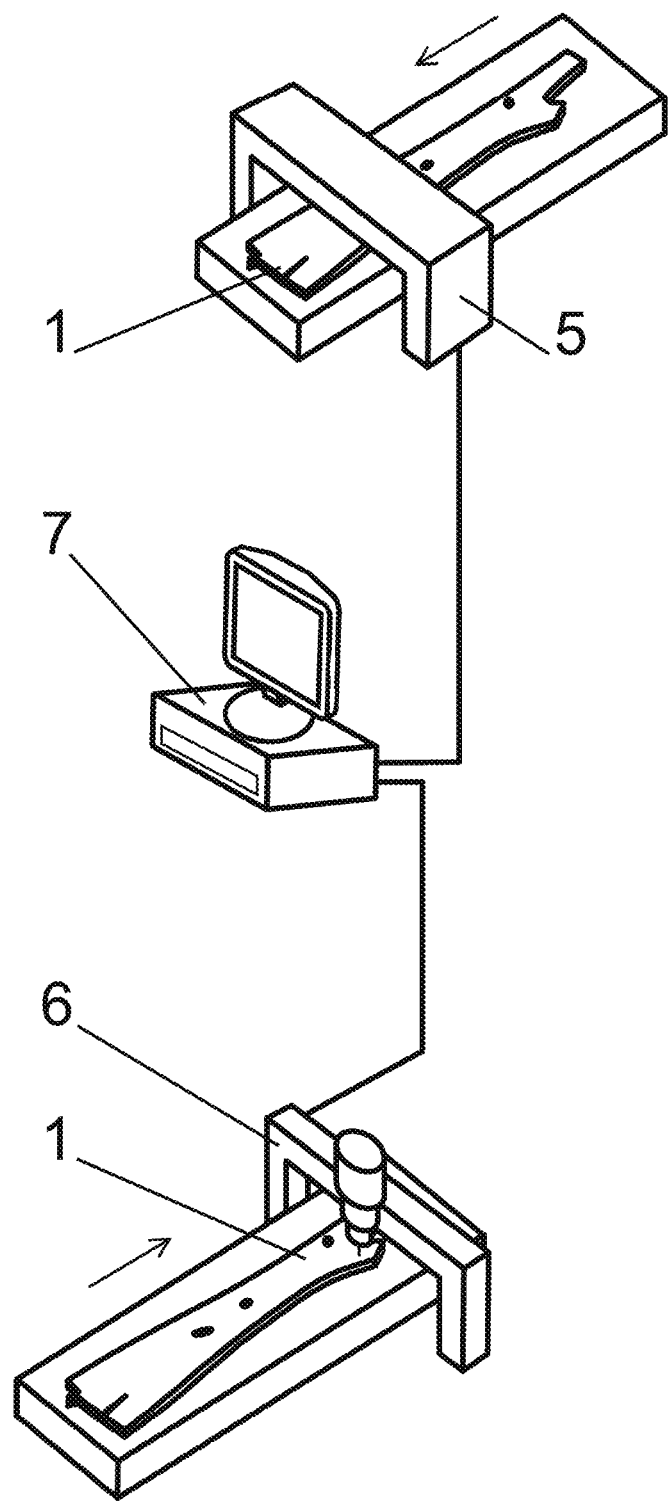
FIG. 6 is a simplified scheme of the connection of the elements in the system according to this invention.
Figure 7:
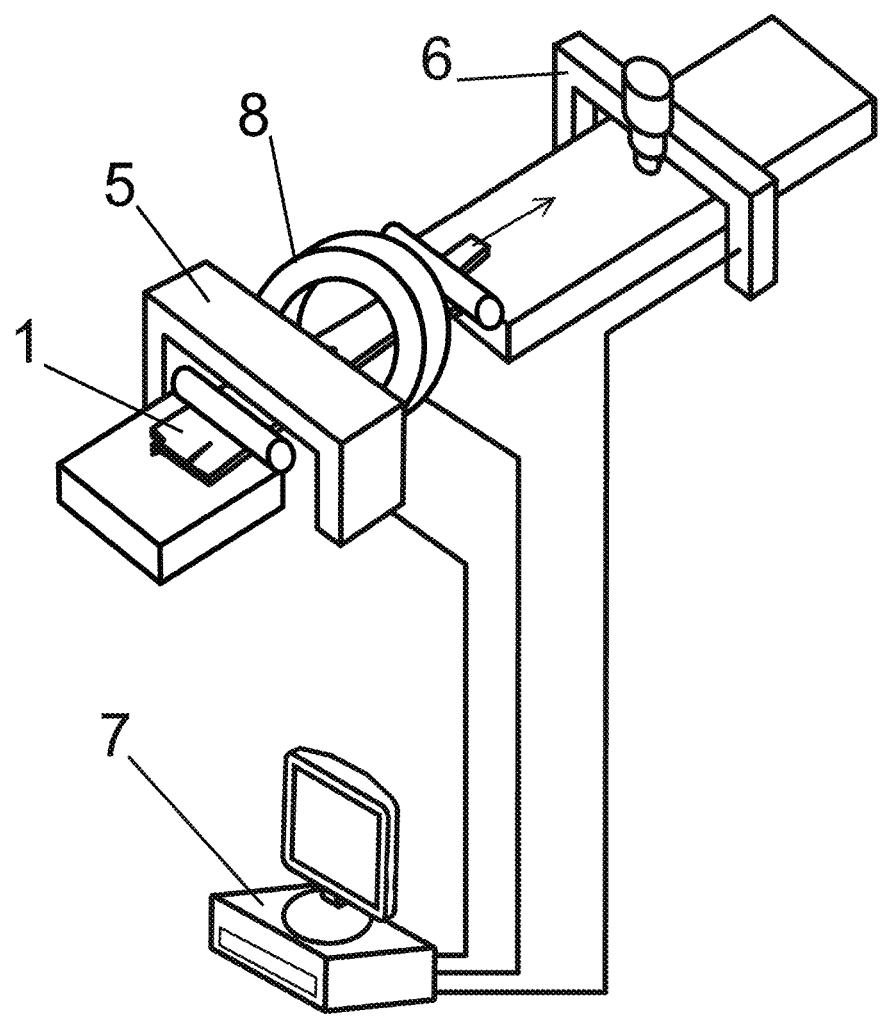
FIG. 7 depicts a system with use of the CT scanner where the plank moves between two suppliers whereby the material is optically scanned from all sides.

System in this example according to FIGS. 4 and 5 is concerned by the classification of the defects 2 in such a way that the acceptable defects 2 can appear on the resulting final products 3. On the scanner's 5 output there is a file which describes the outer boundaries of the scanned surface S and it discloses the boundaries of the recognized defects 2 alongside their classification into sets. Each defect is marked by category $E\_C[i]$ except for polygon $E\_P[i]$; the number of categories is chosen pursuant to the nature of the material 1 and the clients' demands.

One of the sets contains unacceptable defects 2 such as cracks running through a whole width of the plank.

In this example the value of the residual material Crest is taken into account during optimization, too.

The list of the desired products 3 has a structure with the parameters $W[j]$, $L[j]$, $C[j]$ (width, length, weight coefficient) and $A\_E[j, x]$, which denotes the acceptability of the defect 2 defined as E. If j-th product 3 can contain a defect 2 indexed x, it holds that $A\_E[j, x]=1$, therefore it can overlap with all defects 2 defined as $E\_P[k]$ for which $E\_C[k]=x$ holds.

Firstly, the choice of the products 3 sel[j]=1 takes place during the optimization. The position of the lower left corner of the j-th product 3 is posX[j], posY[j]–X, Y. The positions are valid only for the products 3 selected to the choice of the cutting plan 4.

An allowed surface S_P[j] is defined for the placement of the j-th product 3 as Σ E_P[i] for all i for which A_E[j, E_C[i]]< >0 holds. For the j-th product 3 it also holds that its definition by the polygon P[j] in form of a laid rhomboid with dimensions W[j] x L[j] which has a lower left corner defined by the position posX[j], posY[j].

The correct solution of the task for the selected products 3 is written down as S_P[j] ΠP[j]=P[j] under the condition sel[j]=1. The mutual non-collision is defined by the condition P[j1]ΠP[j2]=0 for all j1, j2, for which sel[j]=1 holds.

Through optimization a maximum value of Pplaced=Σ C[j] is sought for all j where sel[j]=1. In case of counting of the value of the residual material, the maximum value of the sum Pplaced+Prest is sought.

Optimization can contain a learning step. The planks following one another from one and the same trunk have a mutually following or intertwined shape of the boundary polygon. Comparison of the just scanned surface of the material 1 with the surface of the previous scan can be used, and it can be assessed whether this is a cut from the same source—for example, from the same trunk. If it is, the recognition of the defects and their classification will be simple because we can expect them in the same or slightly moved or tilted positions as in the previous scan. The move or tilt is usually given by the width of the material 1 and the angle of cut relative to the direction of the spreading of the defect 2.

Linear optimization used in this example can be substituted by other ways of seeking of the maximal value of the function. The method according to this invention is not tied to a single algorithm; the crucial aspect of this invention is the interconnectedness of the optimization with the freedom of the cutting line, whereby during the optimization a maximal weight count is sought, without the need for all elements from the set of the desired products 3 to be present at the same time.

Example 3

The system in this example according to FIGS. 2 to 5 and 7 uses a CT scanner 8, too, by which the inside of the material 1 is radiologically investigated.

The material 1 runs between two suppliers which secure the regular movement of the material 1 and they produce a free space between them for the placement of the optical scanner 5 and CT scanner 8.

The scanner 5 allows for scanning of the surface from all sides; it has scanning strip with a given optics and it has cameras placed from above, from below and from sides. The complete surface of the material 1 is scanned within a single drag of the material 1. A CT scanner 8 with a shielding cover is placed behind the optical scanner 5. The X-ray runs through the material under various angles; the detectors analyze the impacting radiation and the computer creates an image in the scanned cross-section. The output from the CT scanner 8 is connected to the controlling computer 7, where the data from the optical scanning arrive, too. When assessing the defects 2 the mutual relationship between the data from the scanner 5 and CT scanner 8 is assessed, too.

The in-depth defects 2 inside the material 1, recognized by CT scanner 8, which do not manifest themselves on the surface, can be a subject to the independent category of the defects 2. After the creation of the cutting plan 4 the excerpts from the data of the scanning which correspond to the given position of the product 3 are assigned to individual products 3. The data are stored for the purposes of eventual complaint. It is possible to determine both inner and outer state of the product 3 during the expedition for each product 3.

INDUSTRIAL APPLICABILITY

Industrial applicability is obvious. According to this invention it is possible to repeatedly optimize the cutting plan of the distribution of the flat products on the surface of the natural material, whereby the high effectiveness of the use of the material is achieved.

LIST OF RELATED ELEMENTS

1—material
2—defect
3—product
4—cutting plan
5—scanner
6—cutting machine
7—controlling computer
8—CT scanner
CT—Computed Tomography

The invention claimed is:

1. A method for cutting flat products from wood, the method comprising the steps of:
   providing a database on a computer, including storage information about a pre-set set of shapes and dimensions of flat products (3) to be cut, wherein the pre-set set includes a predetermined group of elements;
   running the flat material on a working table having an optical scanner located on a first side of the working table and a CT scanner located on a second side of the working table, wherein the first side of the working table is opposite to the second side of the table;
   simultaneously scanning an image of a first visible side of the flat material (1) by using the optical scanner and scanning a second image of a second visible side of the material by using the CT scanner;
   identifying defects (2) of the scanned image of the material (1) by using a controlling unit located on the scanner;
   setting boundaries of the individual flat products (3);
   sending information obtained in the identification step to the database;
   assigning a position to each one of the identified defects by using a computer program on the computer;
   creating a cutting plan (4) by using linear programming without the need to cut all flat products (3) from the group of desired products, wherein during the creation of the cutting plan (4), locations of the identified defects (2) of the material (1) are taken into account;
   using a numerical algorithm to determine a distribution of the flat products (3) on the available surface of the material (1);
   assigning a weight coefficient to each one of the elements from the pre-set set of the shapes and the dimensions of the flat products (3);
   wherein the optimization of the distribution of the flat products (3) is realized with a goal of achieving a highest sum of a number of the flat products (3) multiplied by a weight coefficient of a given product (3);

immediately cutting the material (1) by using a cutting machine (6) by following the cutting plan.

2. The method according to claim 1, wherein the weight coefficient expresses an economic value of the flat product (3).

3. The method according to claim 1, wherein the material (1) is selected from a group of hardwood consisting of an oak, a beech, an elm, an ash, a black locust, and a walnut tree.

4. The method according to claim 1, wherein the scanner is an optical scanner (5) working in a visible spectrum and a contrast of neighboring points of the image is analyzed for the purpose of recognition of the defects, wherein the identified defects delimits the boundaries of a selected zone which is subsequently compared to pre-set criteria of the defects (2).

5. The method according to claim 1, wherein the material (1) is cut by a laser cutting ray whose position with regard to the material can be set in at least two planes.

6. The method according to claim 1, wherein the detected defects (2) are categorized into multiple sets, wherein at least one set contains the defects (2) which are acceptable in the flat product (3), whereby a localization of at least one acceptable defect (2) enters into the process of the cutting plan (4) as a boundary condition.

7. The method according to claim 1, wherein the weight coefficient is directly proportional to a size of the given flat product (3) and indirectly proportional to a number of the acceptable defects (2).

8. A system for cutting flat products from wood, the system comprising:
   a working table having a first side and a second side, the first side is opposite to the second side;
   an optical scanner (5) adapted to scan a first side of a material and located on the first side of the working table;
   a CT scanner adapted to scan a second side of the material and located on the second side of the working table;
   a cutting machine (6) located on the working table; and
   a controlling computer (7) connected to the scanner (5) and the cutting machine (6), wherein a database with at least one set of desired shapes and dimensions of flat products (3) is stored in the controlling computer (7), and the controlling computer (7) has an output for a control of a cutting line of the cutting machine (6), according to a cutting plan (4);
   wherein the optical scanner and the CT scanner simultaneously scan both sides of the material when the material runs though the working table;
   wherein a weight value stored in the database is assigned to each flat product (3) from the at least one set; a program for producing the cutting plan (4) by using a linear programming, whereas a maximum sum of weight values of the flat products (3) is in the controlling computer (7);
   wherein the cutting machine (6) is designed for jump changes in a direction of the cutting line and that the cutting machine (6) is a machine acting on a point.

9. The system according to claim 8, wherein the cutting machine (6) is a laser cutting machine.

10. The system according to claim 8, wherein the scanner (5) is placed between two suppliers that move the material (1).

* * * * *